United States Patent [19]

Crowley

[11] 4,321,045
[45] Mar. 23, 1982

[54] BRIDGE LEARNING AND PLAYING KIT
[76] Inventor: Helen L. Crowley, 9410 S. Richmond, Evergreen Park, Ill. 60642
[21] Appl. No.: 178,853
[22] Filed: Aug. 18, 1980
[51] Int. Cl.³ .............................................. G09B 19/22
[52] U.S. Cl. ................................ 434/129; 273/148 A
[58] Field of Search ............... 206/315 R; 273/148 R, 273/148 A, 149 P; 434/129

[56] References Cited
U.S. PATENT DOCUMENTS 1,659,588  2/1928  Balmforth ........................ 273/148 A
3,301,619  1/1967  Mead ................................ 206/315 X
3,731,399  5/1973  Gordy .................................. 434/129

FOREIGN PATENT DOCUMENTS 535269  4/1941  United Kingdom ............ 273/149 P

OTHER PUBLICATIONS

Ernest W. Rovere, "Contract Bridge Complete", outer cover, inside front cover and contents page indicating indicia on back inside cover, 1965.

"Doop" TM 1970.

Primary Examiner—Harland S. Skogquist
Attorney, Agent, or Firm—Thomas R. Vigil

[57] ABSTRACT

The bridge learning and playing kit comprises four position cards. The first position card has information thereon for instructing a first bridge player how to bid in the game of bridge on the opening bid and subsequent bids. The second position card has information thereon for instructing the second player how to respond to the opening bid and make subsequent bids. The third position card has information thereon to instruct a third player how to respond to the first and second bids and what subsequent bids to make. The fourth position card has information thereon for instructing a fourth player to bid in a game of bridge what response bid to make to the first, second and third bids and what subsequent bids to make. The cards are passable around a card table to the different positions of the players. The kit preferably also includes an instruction booklet, two decks of bridge playing cards, a pad of score sheets, a pencil and a box sized to receive and hold all the items of the kit.

10 Claims, 7 Drawing Figures

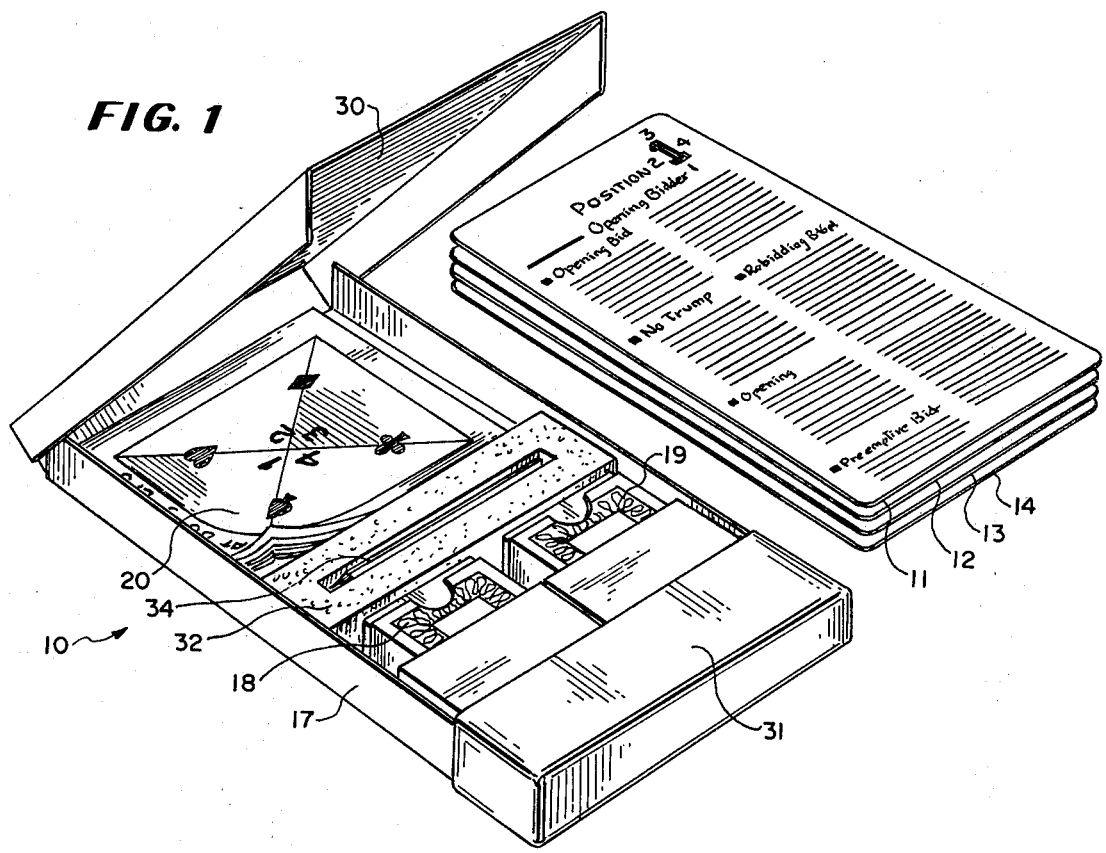

BRIDGE LEARNING AND PLAYING KIT

BACKGROUND OF THE INVENTION

1. Field of the Invention

The present invention relates to a bridge learning and playing kit. More specifically, the present invention relates to a kit including cards having playing information thereon which are easily passable around a card table for use in playing the game of bridge.

2. Description of the Prior Art

Heretofore various aids for playing bridge have been provided. For example, it has been previously proposed to place on a tablecloth information regarding the manner in which a player of the game of bridge should bid and respond to bids for his position. However, each time a hand of bridge was finished, the players would have to get up and move around the table to the place on the tablecloth relating to their new position in the game of bridge.

Also, various books and booklets have been proposed for use in playing bridge and for providing information to beginners as to how to bid and respond to bids depending upon the position they were playing.

These previously proposed aids for playing bridge, some of which have been referred to above, have not always been satisfactory and at times have been cumbersome and delayed play of the game.

According to the present invention, and as will be described in greater detail hereinafter, a bridge learning and playing kit is provided which includes position cards, one for each of the four positions played in a game of bridge. These cards have adequate information for assisting the player in playing his position relative to the bids and counterbids made by the other players. Also, once the hand of bridge is finished, the cards can be passed around the table for assisting the players in playing the next hand.

SUMMARY OF THE INVENTION

According to the invention there is provided a bridge learning and playing kit comprising four position cards, the first position card having information thereon for instructing a first bridge player how to bid in the game of bridge on the opening bid and subsequent bids, the second position card having information thereon for instructing the second player how to respond to the opening bid and make subsequent bids, the third position card having information thereon to instruct a third player how to respond to the first and second bids and what subsequent bids to make, and the fourth position card having information thereon for instructing a fourth player how to respond to the first, second and third bids and what subsequent bids to make, the cards being passable around a card table to the different positions of the players after each hand is played and said cards being made of stiff paperboard material and having a length and width sufficient to enable the instructions to be placed thereon in easily readable type size.

BRIEF DESCRIPTION OF THE DRAWINGS

FIG. 1 is a perspective view of the bridge learning and playing kit of the present invention excluding an instruction booklet thereof shown in FIG. 7 and shows the four position cards of the kit, a box for holding the cards, together with two decks of bridge playing cards and a pad of scoring sheets received in the box.

FIG. 2 is a plan view of one side of the first position card.

FIG. 3 is a plan view of the backside of the first position card.

DESCRIPTION OF THE PREFERRED EMBODIMENT

Figure 4:
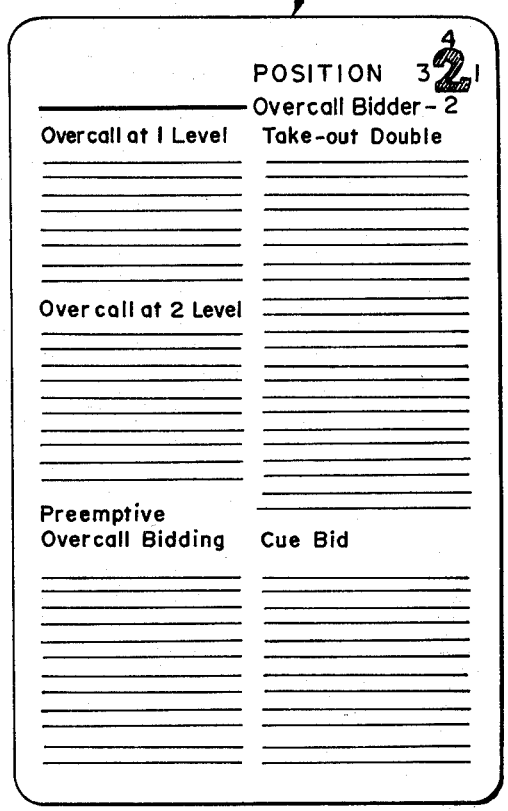
FIG. 4 is a plan view of the second position card having instructions on one side only.

Referring now to FIG. 1 there is illustrated therein the bridge learning and playing kit of the present invention generally identified by reference numeral 10. According to the teachings of the present invention, the kit 10 includes four position cards 11, 12, 13 and 14, an instruction booklet 16 (FIG. 7), a box 17, two decks of bridge playing cards 18 and 19, and a pad of score sheets 20.

Each of the position cards 11-14 is of a convenient size to contain all the important information that is needed to play that position in an appropriate manner. In this respect, in one preferred embodiment of the kit 10, the cards 11-14 have a size approximately 5½ inches (13.97 cm) by 8½ inches (21.59 cm).

Also, in one preferred embodiment, the cards 11-14 are made of a paperboard material with the instructions printed thereon and are then coated with a plastic material so that the printing on the cards is impervious to liquids or foodstuffs that may be spilled thereon. Also, it renders the cards 11-14 more durable so that they will have a longer useful life.

Turning now to FIGS. 2 and 3, it will be apparent that the first position card 11 has instructions on a front side 21 and on a backside 22. These instructions are set forth as follows:

OPENING BID

Less than 12 points—
Pass
12 points—only with 6-card suit—
Open
13 points—optional—need biddable 4-card suit (4 points), plus rebid (another 4 (or more) card suit), plus 2 quick tricks Bid 1 of suit 14 points—mandatory opening—

Bid 1 of longest suit

After 2 passes, third position hand may open bidding with 10 or 11 points and a good long suit.
Example: Qxx AJxxx xx xxx (A total of 11 points)
If partner responds, there is no obligation to rebid.
BIDDABLE SUITS: A 4-card major suit (Spades or Hearts) is biddable if it is headed by 4 high card points or more.
A 4-card biddable minor suit (Diamonds or Clubs) must be headed by 2 high card points.
Do not rebid a 4-card suit unless partner raises suit.
A 5-card suit headed by 2 honors is rebiddable.
A 6-card or longer suit is rebiddable.

NO TRUMP OPENING BID

Should have balanced distribution.
Should not bid No Trump with a void, singleton or 2 doubletons. (16-18) High Card Points (HCP)—with balanced distribution

1 NO TRUMP 19-21 points—Don't open with no trump—BID 1 OF LONGEST SUIT. Then give Jump Bid in NO TRUMP.
21-23 HCP—Bid 2 No Trump, if you have all 4 suits stopped.
24-27 HCP—Bid 3 No Trump, if you have all 4 suits stopped.

OPENING 2-BID IN A SUIT

Only if you have:
21 points and a 7-card suit
23 points and a 6-card suit
25 points and a 5-card suit (or 1 point less with second good 5-card suit)
Or have within your hand:
9 sure tricks in Hearts and Spades
10 sure tricks in Clubs and Diamonds or within 1 trick of game.

PREEMPTIVE BID (3, 4 or 5 BID) IN A SUIT

If you are vulnerable:
Bid 3 if you have 7 sure tricks in your hand
Bid 4 if you have 8 sure tricks in your hand
Bid 5 if you have 9 sure tricks in your hand
If you are not vulnerable:
Bid 3 if you have 8 sure tricks in your hand
Bid 4 if you have 9 sure tricks in your hand
Bid 5 if you have 10 sure tricks in your hand

REBIDDING 13-16 POINTS MINIMUM HAND

If partner responds in another suit, you must bid again. If partner responds with bid of 2 in your suit, you may pass if you oepned with a minimum hand. (You can, however, promote (refigure) your point count if you have a 5 or longer card trump suit. Add 1 point for the 5th card and 2 points for each additional card. If, after refiguring your point count, you still hold between 13 and 16 points, you should pass. If partner responds with 1 NT, this is a weak response, you may pass if you opened with a minimum hand. If your partner responds with a new suit at one level or two level (not jump shift) (he has 6-18 points) you must rebid one of the following (which indicates a 13-16 hand).
1. Rebid opening suit if you have nothing else to rebid.
2. Rebid one no-trump (if you have 12-15 HCP and a balanced hand).
3. Rebid new suit at 1 level.
4. Rebid new suit at 2 level (this is the 3rd suit mentioned and must be lower in rank than your original opening bid suit).
5. Raise partner's suit one level (if you have 14-16 points and adequate trump support—J, 10, x) in partner's suit.

17-19 POINTS

If partner responds, you should show your point count by bidding as follows:
1. If partner passes, you pass unless you have a very strong suit. If you do possess this strength, bid 2 of that suit.
2. If partner bids one of your suit, you bid 3 of your suit. You should have 6-card or better.
3. If partner bids a new suit at the one level, you must rebid one of the following:
   a jump raise in your trump suit (only if you have a 6-card suit or better).
   if you have 4 of partner's bid suit, you give a jump raise in his suit.
4. Raise partner's two level bid to 3 level if you have adequate trump support (J, 10, x).
5. Bid 2 NT over partner's level bid (if you have a balanced hand and 15-18 HCP).
6. Bid a completely new suit (if you have 4 cards in that suit).

19+ POINTS

If your partner responds, you should show your point count by bidding as follows:
Jump to game (if you've opened with a major suit and it is a 6 or 7 card suit).
Jump to game in partner's major suit (if you have 4 cards in that suit).
If partner bids at one level (one over one response), jump to 2 NT if you have 19 HCP and balanced hand.
If partner bids at two level (two over one response), jump to 3 NT if you have 20-21 HCP and balanced hand.
Bid a jump shift if you have 22 or more points (a jump shift is bidding a third suit at a level one higher than necessary).

Referring to FIG. 4, the second position card 12 has instructions on one side only and these instructions are as follows:

Overall at 1 level

Bid one of a suit if you have a 5-card or longer suit, 2 touching honors (AK, KQ, QJ) and 10-15 points (major suit) 10-18 points (minor suit). Bid one NT if you have 16-19 HCP, a balanced hand and opening bidder's suit well stopped.

Overcall at 2 level

Bid 2 of suit if you have a 6-card or longer suit, 2 touching honors (AK, KQ, QJ) and 10-15 points (major suit), 10-18 points (minor suit). Don't bid at the 2-level if you think you will lose more than 2 trump tricks.
Bid 2 NT if you have 22-24 HCP, a balanced hand and opening bidder's suit well stopped. After a 1 NT opening bid, bid 2 of a suit if you have an opening count hand and a long suit. Preemptive Overcall Bidding (Weak or Sacrifice Bids) Single jump overcall—when you have less than 8 HCP and a good 6-card suit with touching honors (AK, KQ, QJ). (If you are vulnerable, be sure of 7 tricks, or 6 tricks if not vulnerable). Example: 1D-2H
Double jump overcall—when you have less than 10 HCP and a good 7-card suit with touching honors (AK, KQ, QJ). (If you are vulnerable, be sure of 7 tricks, or 6 tricks if not vulnerable). Example: 1D-3 H or 4H

Take-out Double

If you have 13-15 points, you must be weak in the opener's suit and have at least 3 cards in the unbid suits, or a long strong suit that can be bid if your partner responds in a suit that you cannot support). If you have 16-18 points and a good suit (5 and touching honors), double on the first round and bid at the 3 level on your second bid.

If you have 22 or more points and a good suit (5 and touching honors), double on the first round and bid at 4 level on your second bid.

Cue Bid (Bidding the opener's suit at the 2 level)

You should have 21 or more points or within one sure trick of game. This indicates a very strong hand, with first round control of opener's suit (Ace or void), and support for other 3 suits or a long, solid suit of your own.

Figure 5:
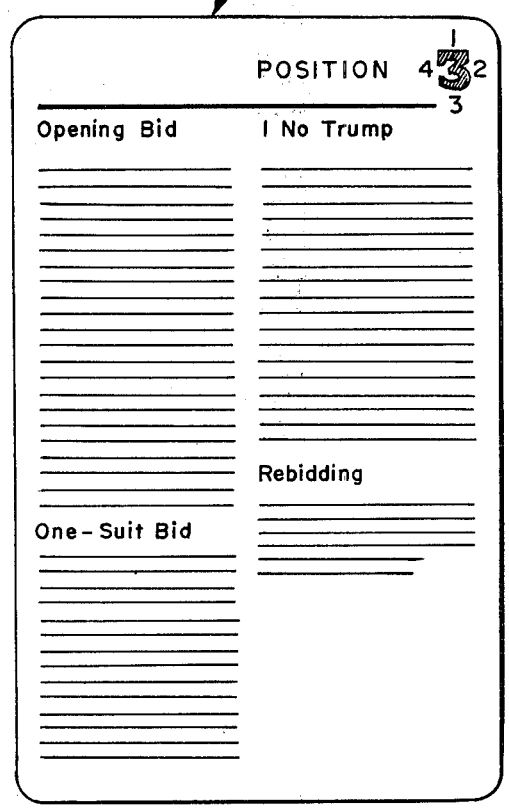
FIG. 5 is a plan view of the third position card having instructions on one side only.

Referring now to FIG. 5, the third position card 13 has instructions on one or both sides and these instructions are as follows:

OPENING BID

After 2 passes, third position hand may open bidding with 10 or 11 points and a good suit you would like your partner to lead at his first opportunity.

Example: Qxx AKJxx xx xxx (a total of 11 points)

If partner responds, there is no obligation to rebid.

RESPONDING TO AN OPENING BID BY PARTNER (Opening Bidder)

Your partner has opened the bidding and the second position (opponent) has passed If your partner opens with a

ONE-SUIT BID

| | |
|---|---|
| 0–5 points | PASS |
| 6–10 points | RAISE your partner's suit to the 2 level if you have adequate trump support (J.10, x) or better. |
| 6–12 points | Bid 2 of 4-card lower-ranking suit (must have at least 10 points to bid at 2 level) BID 1 of a 4-card higher-ranking suit. |
| 13–16 points (with 4 trumps) | JUMP RAISE to the 3 level of partner's suit (this indicates a demand for game). |
| 13–15 HCP | JUMP to 2 NT if you have a balanced hand and all unbid suits stopped. |
| 16–18 HCP | JUMP to 3 NT if you have a balanced hand and all unbid suits stopped. |
| 19 or more points | JUMP SHIFT to new suit if this suit is strong (4 cards or more) or you have good support for partner's suit. |

If your partner opens with a bid of
1 NO TRUMP
With a balanced hand

| | |
|---|---|
| 8–9 HCP | Raise to 2 NT |
| 10–14 HCP | Raise to 3 NT |
| 15–16 HCP | Raise to 4 NT (not Blackwood) |
| 17–18 HCP | Raise to 6 NT |
| 19–20 HCP | Raise to 3 of a suit, then next bid 6 NT |
| 21 HCP or more | Raise to 7 NT |

With an unbalanced hand:

| | |
|---|---|
| 8 or more points (+1 or 2 4-card major suits) | Bid 2 (Stayman) |
| 7 points or less | Bid 2, or only if you have a |

-continued

| | |
|---|---|
| (+ a 5-card suit) | 5-card suit - a sign-off bid |
| 10 or more points (+ a 5-card suit) | Bid 3 of a suit |
| 9 points maximum (+ a 6-card suit) | Bid 4 or (a shutout bid, opener must pass) |

Your partner has opened the bidding and

The second position (overcaller) has also bid: This is considered a "free response", because the second position has kept the bidding open. Therefore, it allows you not to bid a minimum-point hand.

If you have:

| | |
|---|---|
| 9 points | BID 1 of a suit (if one is open, otherwise PASS - Example: 1 1 PASS) |
| 10 HCP | BID 1 NT if you have balanced hand and opponent's hand stopped |
| 10–12 points | BID 2 of a suit if you have an unbalanced hand |
| 13–17 points | JUMP RAISE in partner's suit if you have adequate trump support (J, 10, x) |
| 18 or more points | JUMP SHIFT to new suit |

If the overcaller DOUBLED your partner's opening bid and you have:

| | |
|---|---|
| less than 9 points | PASS |
| 10 points or more | RAISE your partner's suit or bid your best suit |
| 10–11 HCP | REDOUBLE |

REBIDDING

Third position rebidding should follow these general guidelines:

| | |
|---|---|
| With a second position pass | |
| 6–9 points | Bid only once |
| 10–12 points | Bid twice |
| 13 or more points | Keep bidding alive until game is reached |

With a Second Bid by the Second Position Rebidding to your partner's second bid and a second bid by your overcaller opponent becomes a matter of judgement on your part. If you feel, as a result of the bidding and the number of points in your hand, that you ahd your partner have game in your combined hands, continue the bidding. Otherwise PASS, because your partner, as an opening bidder, will still have an opportunity to make the final decision regarding game.

Figure 6:
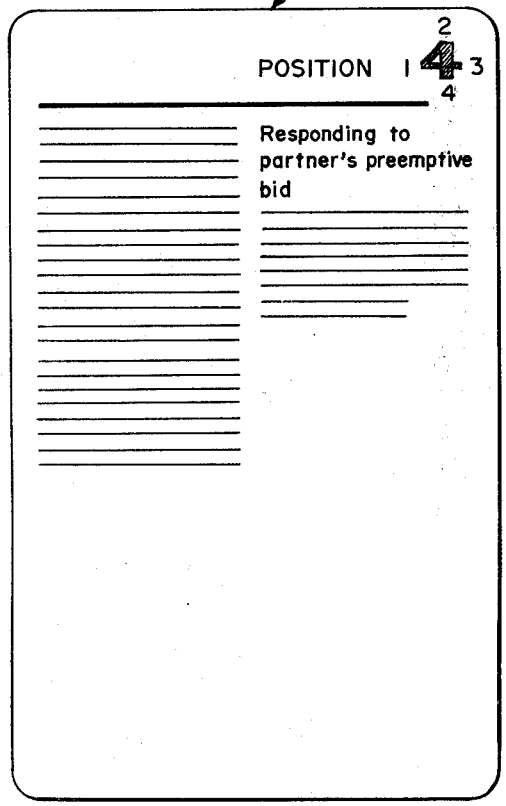
FIG. 6 is a plan view of the fourth position card having instructions on one side only.

Referring now to FIG. 6, the fourth position card 14 has instructions on one side only and these instructions are as follows:

Point count of 13–14 points is required after 3 PASSES to open the bidding.

Responding to Your Partner's (Overcaller) Bid at the 1 or 2 Level

| | |
|---|---|
| 9 points or less | RAISE to 2 level (or 3 level if bid was 2 of partner's suit headed by the Q or better (or 3 spots). |
| 12–13 points | JUMP RAISE in partner's suit if you have 3 of his suit. |
| 14 or more points | JUMP immediately to game in his |

| | |
|---|---|
| -continued | |
| suit. | |

If partner has made a preemptive bid:
RAISE to game only if you have 3-4 quick (sure) tricks and at least one of his suit. You can made a BALANCING BID—made when your partner has passed and your opponent to your right (THIRD POSITION) has passed.

| | |
|---|---|
| 8-13 HCP | BID 1 of a suit if you have a biddable suit and Spades stopped; if not and you want to keep the bidding open, DOUBLE |
| 11-14 HCP | BID 1 NT if you have a balanced hand the opening bidder's suit stopped. |
| 16-18 HCP | DOUBLE and next BID NT. |

After a take-out double:
Partner of the take-out doubler must bid if there is no intervening bid. 0-10 points—bid normally 11 points—or more make a jump bid in best suit 9 points are needed to bid after an intervening bid.

Figure 7:
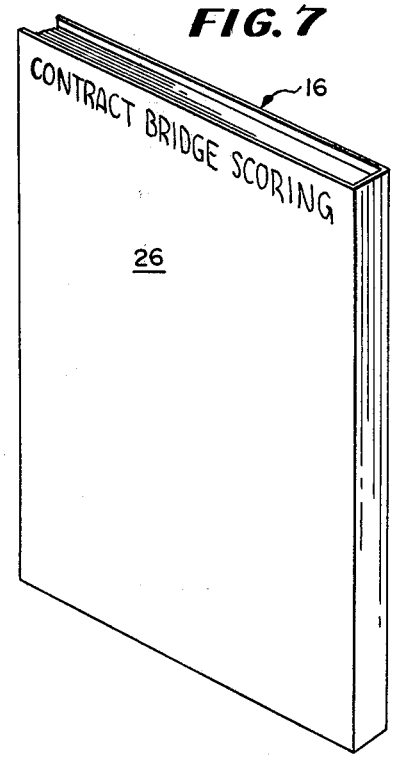
FIG. 7 is a perspective view of the instruction booklet of the bridge learning and playing kit showing the back cover thereof with contract bridge scoring thereon.

Referring now to FIG. 7, the instruction booklet 16 of the kit 10 has information therein on how to learn bridge by the positional bridge method using the position cards 11-14. It also contains basic instructions for the bridge beginner, information on the bidding phase, the sequence of suits and honor cards and distribution points. Further, it has information on the opening bid, opening bids of 2 and scoring as well as penalties in scoring and information on a redoubled contract. Also, there is information on how to respond to the "take-out" double, a no trump double and preemptive double. Further information is provided on the Blackwood Convention and the Stayman Convention and techniques in the play of the hand. Finally, on the back cover 26 of the instruction booklet is set forth contract bridge scoring.

The instruction booklet 16 has approximately the same dimensions as each one of the cards 11-14 and the box 17 has a length and width slightly larger than the dimensions of the booklet 16 and cards 11-14 so as to be adapted to receive them therein.

Referring again to FIG. 1, it will be apparent that the box 17 has a cover 30 hinged to one end thereof with the cover 30 extending across a good portion of the top of the box 17 but not all the way across the top of the box 17 with a portion 31 of the top of the box 17 being integral with the box 17 to provide a pouch for receiving the decks of cards 18 and 19. Also, a partition 32 for holding a pencil 34 is received in the box 17 between the two decks of cards 18 and 19 and the pad of score sheets 20.

As is apparent from FIG. 1, the items of the kit, namely the four position cards 11-14, the instruction booklet 16, the decks of cards 18 and 19, the pad of score sheets 20 and the partition 32 with a pencil 34 received therein, are arranged to be compactly received within the box 17. Also, it will be noted that the cards 11-14 and booklet 16 are easily received in the pouch portion 31 above the decks of cards 18 and 19, the partition 32 and the pad 20 of score sheets.

In the use of the bridge learning and playing kit 10, each player of the game of bridge is given a position card corresponding to his position relative to the dealer who determines the respective playing positions of the other players. After a hand is played, the cards are passed on to the adjacent player who will then use the card for playing the next hand of bridge.

The position cards 11-14 and their passability around a card table have been found to greatly facilitate the learning and playing of bridge with everyone having the same information available to them.

From the foregoing description it will be apparent that the bridge learning and playing kit 10 of the present invention has a number of advantages, some of which have been described above and others of which are inherent in the invention. Accordingly, the scope of the invention is only to be limited as necessitated by the accompanying claims.

I claim:

1. A bridge learning and playing kit comprising four position cards, the first position card having information thereon for instructing a first bridge player how to bid in the game of bridge on the opening bid and subsequent bids, the second position card having information thereon for instructing the second player how to respond to the opening bid and make subsequent bids, the third position card having information thereon to instruct a third player how to respond to the first and second bids and what subsequent bids to make, and the fourth position card having information thereon for instructing a fourth player how to respond to the first, second and third bids and what subsequent bids to make, the cards being passable around a card table to the different positions of the players after each hand is played and said cards being made of stiff paperboard material and having a length and width sufficient to enable the instructions to be placed thereon in easily readable type size.

2. The bridge learning and playing kit according to claim 1 wherein said cards are approximately 8½ inches (21.59 cm) by 5½ inches (13.97 cm).

3. The bridge learning and playing kit according to claim 1 wherein said cards have a plastic protective coating on both sides thereof.

4. The bridge learning and playing kit according to claim 1 including an instruction booklet.

5. The bridge learning and playing kit according to claim 4 wherein said instruction booklet has contract bridge scoring information on the back cover thereof.

6. The bridge learning and playing kit according to claim 1 including an instruction booklet, a box sized to receive said instruction booklet and said position cards therein, said instruction booklet and said position cards having the same approximate size.

7. The bridge learning and playing kit according to claim 6 including two decks of bridge playing cards and a pad of bridge scoring sheets received within said box.

8. The bridge learning and playing kit according to claim 7 wherein said box has a cover pivotally connected to one edge of said box.

9. The bridge learning and playing kit according to claim 8 wherein said cover extends only part way across the top of the box with the remaining top portion of the box being integral with the rest of the box to form a pouch for receiving the two decks of cards and the upper or lower portion of said position cards.

10. The bridge learning and playing kit according to claim 7 including a pencil received within said box.

* * * * *